Nov. 2, 1971     C. A. WEISE     3,616,648

THRUST REVERSER FOR FAN JET ENGINES

Filed June 26, 1970     5 Sheets-Sheet 1

INVENTOR.
Carl A. Weise
BY
Wood, Herron and Evans
ATTORNEYS

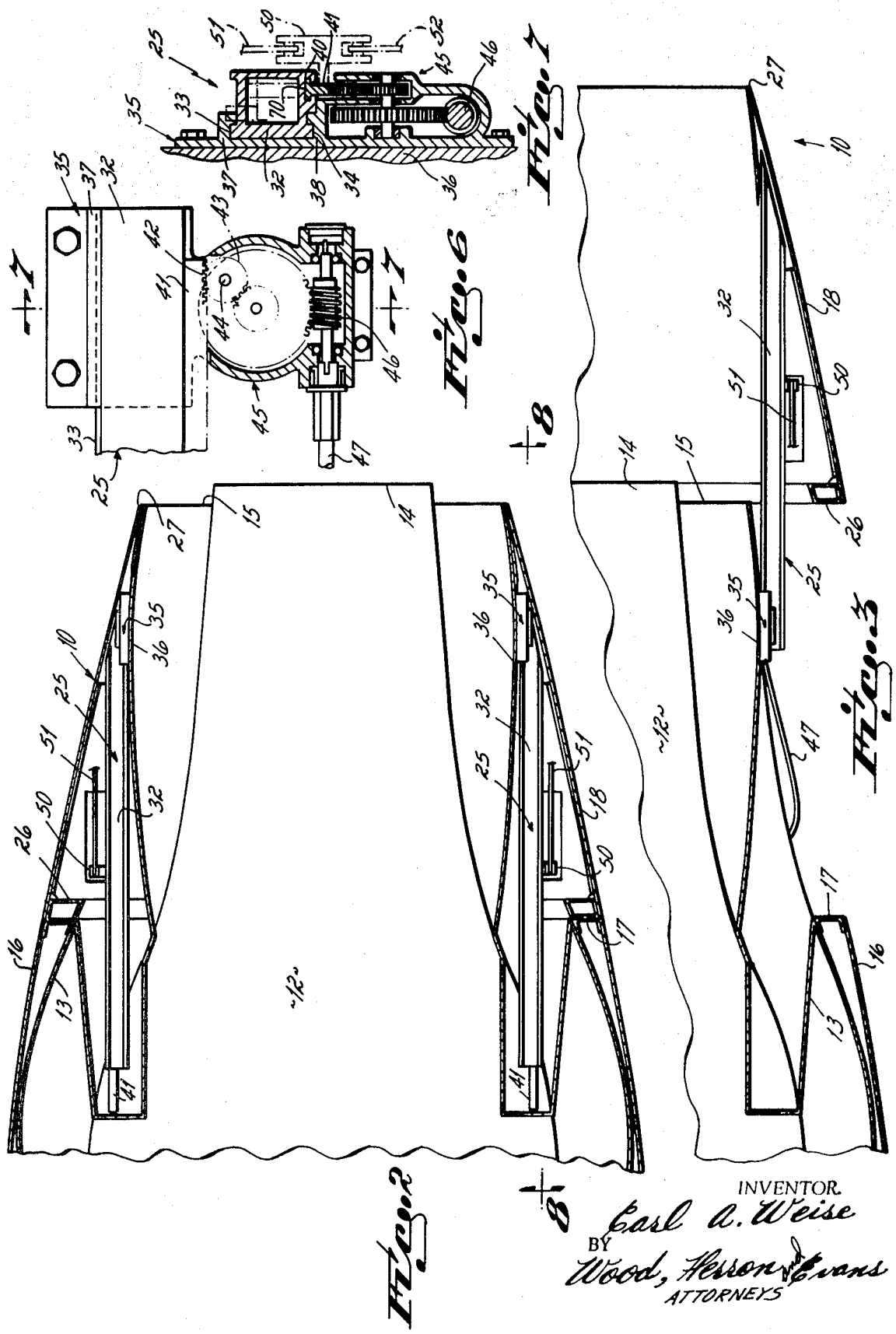

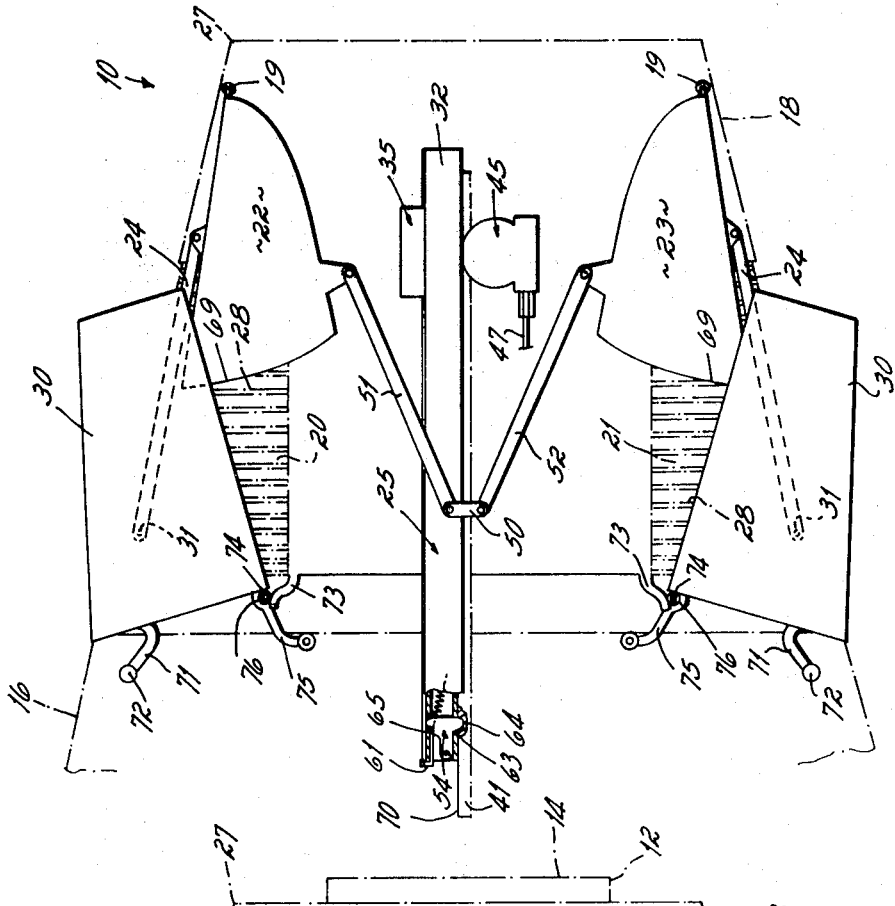
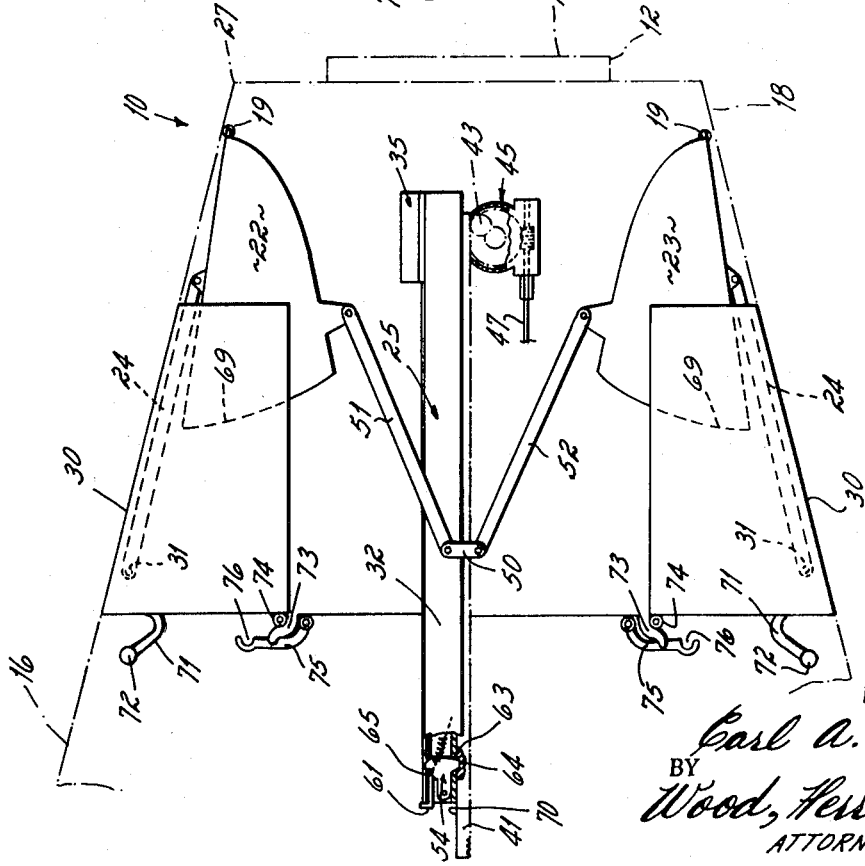

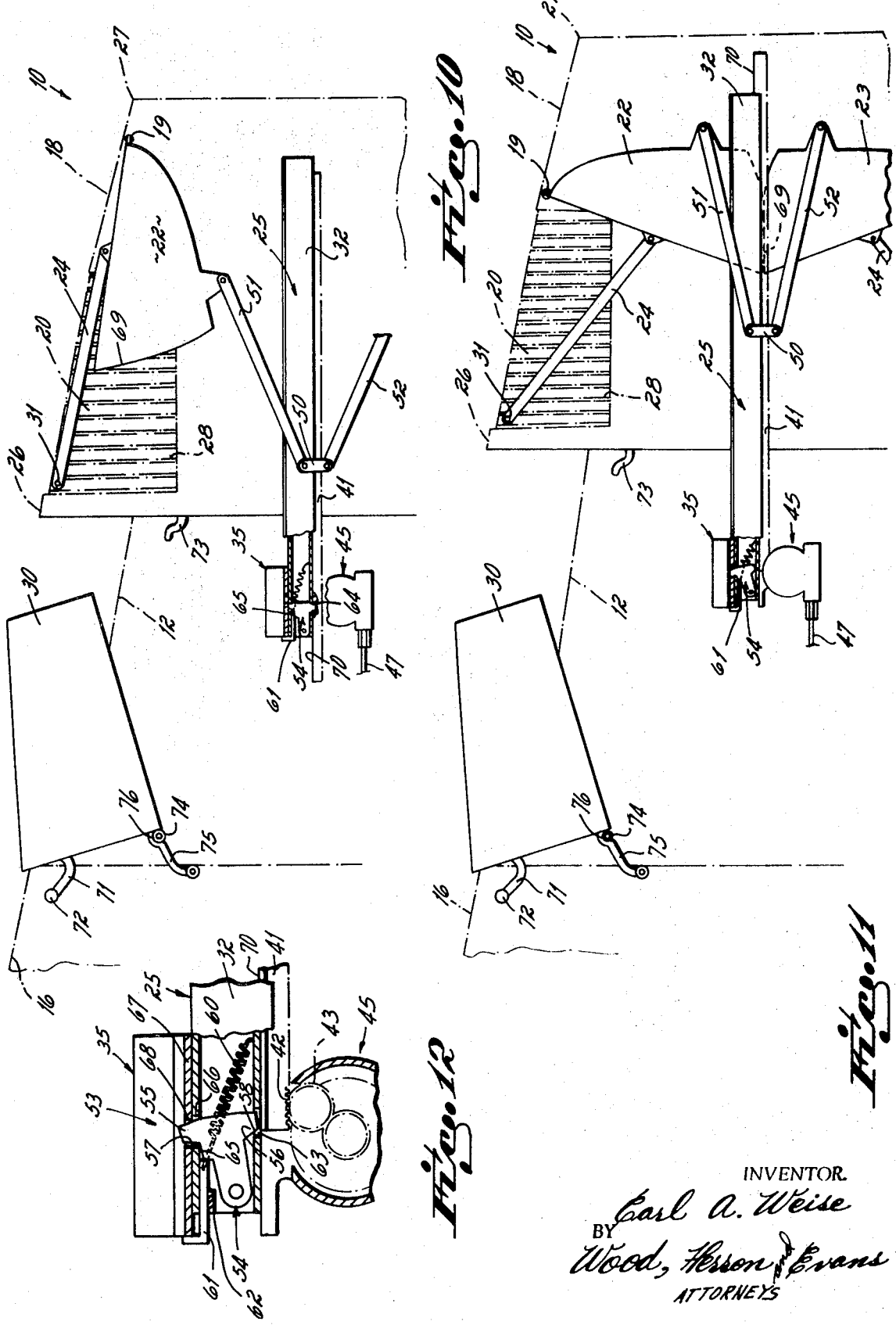

United States Patent Office 3,616,648
Patented Nov. 2, 1971

3,616,648
THRUST REVERSER FOR FAN JET ENGINES
Carl A. Weise, San Pedro, Calif., assignor to
Aeronca, Inc., Torrance, Calif.
Filed June 26, 1970, Ser. No. 50,224
Int. Cl. F02k 3/02
U.S. Cl. 60—226
21 Claims

ABSTRACT OF THE DISCLOSURE

A thrust reverser for a fan jet engine of the type having a main discharge duct surrounded by a fan duct terminating in substantially the same plane. The thrust reverser includes a movable cowl disposed around the outer duct wall of the fan duct during normal operation of the engine. The movable cowl is provided with two sets of forwardly angulated cascades which are normally covered by mounted cover doors. The movable cowl also carries two arcuate blocker doors normally disposed in a stowed position adjacent to the inside wall of the movable cowl. The movable cowl is carried by a pair of translatable rails. The rails are effective to shift the cowl to a position aft of the exhaust ends of the main jet and fan jet ducts. The rails are driven by a rack which is releasably latched to the rails. After the rails have shifted the cowl to its rearmost position, the rack is disengaged from the rails, and is moved rearwardly along the rails. The rack is linked to the movable blocker doors and during its final movement is effective to shift these blocker doors inwardly to block off interior passage through the movable cowl. With the doors in their deployed position, both the main jet stream and fan jet stream impinge upon the doors and are redirected to be discharged through the cascades, whereby they are reversed in direction.

BACKGROUND OF THE INVENTION

This invention relates to jet engine thrust reversers and is particularly directed to a thrust reverser for simultaneously reversing the direction of the main jet stream and fan jet stream of a fan jet engine.

At the present time, it is conventional to provide jet engines with devices for spoiling and/or reversing their thrust during landing and taxiing. One type of such thrust reverser in commercial use involves the provision of clamshells, or buckets, disposed rearwardly and externally of the jet engine. The principal defect of such external target is that it imposes high loads on the engine and is dangerous if it is inadvertently deployed during flight. Moreover, due to these high loads and large members, it is heavy.

A second type of thrust reverser in commercial use includes cascades mounted in, and forming part of, the duct of a jet engine. Means are provided for covering and sealing of these cascades during normal operation of the engine. When the engine thrust is reversed, the cascades are uncovered and some blocker element is positioned to divert the main engine stream outwardly through the cascades. This latter type of thrust reverser has the disadvantage that the cascades are mounted in part of a pressure vessel so that their sealing becomes quite important to minimize gas leakage. With most seals, however, cascades of this type still introduce an objectionable loss of thrust during normal engine operation.

The principal object of the present invention is to provide a thrust reverser which is effective on the jet, either simply or to simultaneously reverse the direction of the main engine and fan exhausts of a fan jet engine.

It is a further object of the present invention to provide a thrust reverser which in normal operation surrounds the fan duct without disturbing the continuity of the duct wall and without increasing the size of the normal nacelle fairing. Thus, the present thrust reverser does not add any appreciable drag during normal engine operation and does not cause any loss of thrust due to peripheral leakage from the exhaust ducts.

It is still a further object of the present invention to provide a thrust reverser which is light in weight and which imposes minimum loads on the engine structure.

A still further object of the present invention is to provide a thrust reverser which does not extend outwardly into the external air flow and, hence, is safe in operation even if it is deployed during flight.

Another object of this invention is to provide a thrust reverser which can readily be adapted for use with various engines and which can be modified so that the exhaust gases are discharged away from the fuselage or other surfaces of the airplane.

In its broadest aspect, the present invention contemplates a thrust reverser comprising a movable cowl which, in normal operation of the engine, surrounds the fan exhaust duct and forms a continuation of the external surface of the nacelle and minimizes external drag. The movable cowl carries one or more sets of outwardly and forwardly angulated cascades. Additionally, the cowl supports two blocker doors which, in the normal operating condition of the engine, are positioned along the inner wall of the movable cowl. When the engine thrust is to be reversed, the cowl and blocker doors are shifted aft beyond the discharge end of the engine and fan exhausts. The blocker doors are then pivoted inwardly to close off the interior of the movable cowl and divert both the main engine and exhaust streams outwardly through the cascades.

It is another aspect of the present invention to provide a single, combined means for shifting the cowl fore and aft, supporting the cowl from the main jet engine, and deploying the blocker doors.

One advantage of the present thrust reverser is that it is highly efficient both in terms of reversing thrust and in terms of minimizing adverse effects on the normal performance of the jet engine. Specifically, the present thrust reverser results in no loss of thrust during normal engine operation and does not impose any appreciable external drag.

Another advantage of the present thrust reverser is that it is of relatively simple construction so that it is quite reliable and possesses a longer operating life.

A still further advantage of the present thrust reverser is that since it is located entirely within the aft fairing of the engine, it can readily be adapted for use with various engines and, hence, can be provided as an optional item of equipment.

An additional advantage of the present thrust reverser construction is that there are no motions required under high unbalanced loads. More particularly, the movable cowl is initially extended rearwardly and subsequently retracted forwardly with the blocker doors open. It is only after the movable cowl is fully extended that the doors are deployed. Since the pressure loads on these doors are essentially balanced, the loads transmitted to the stationarily engine parts are similarly balanced. Also, the blocker doors are returned to their stowed, or open, position before any return movement of the movable cowl is commenced. As a result, the actuating forces and loads on the actuating mechanism are maintained at a low level.

These and other objects and advantages of the present invention will be more readily apparent from the following detailed description of the drawings illustrating a preferred embodiment of the invention.

DESCRIPTION OF THE DRAWINGS

In the drawings:

FIG. 2 is a cross-sectional view taken along line 2—2 of FIG. 1.

FIG. 3 is a partial sectional view similar to FIG. 2 but showing the cowl in its rearward position.

FIG. 6 is an elevational view, partly in section, of the cowl and door actuating drive.

FIG. 7 is a cross-sectional view taken along line 7—7 of FIG. 6.

FIG. 8 is a semi-diagrammatic view showing the movable cowl in its forward position with the blocked doors stowed.

FIG. 9 is a view similar to FIG. 8 showing the movable cowl partially shifted toward its rearward position.

FIG. 10 is a view similar to FIG. 8 showing the movable cowl as it reaches its rearwardmost position with the blocker doors still in a stowed position.

FIG. 11 is a view similar to FIG. 8 showing the blocker doors in a deployed position.

FIG. 12 is an enlarged view, partially in section, showing details of the blocker door deploying mechanism.

Figure 1:
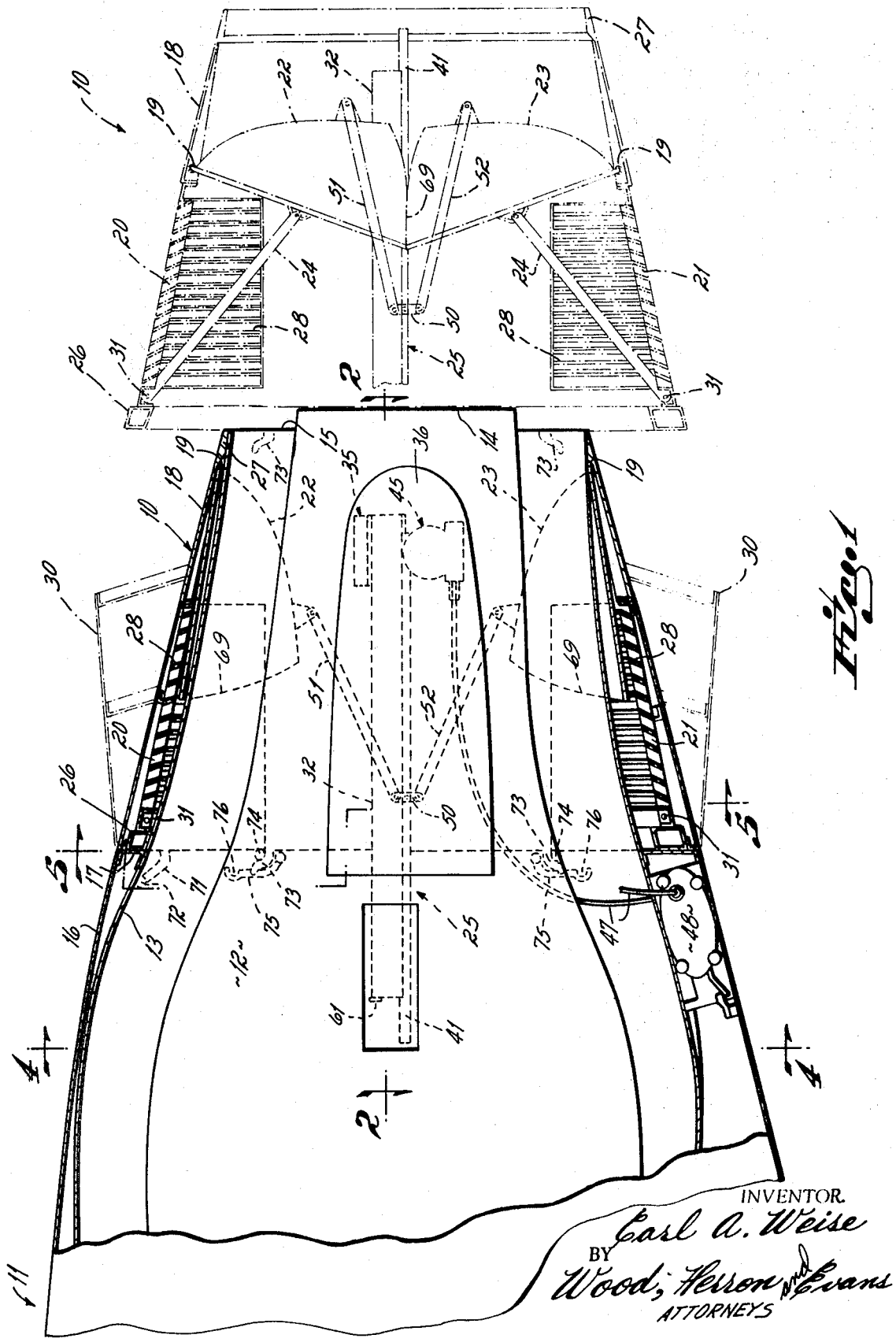
FIG. 1 is a vertical section of the exhaust end of a fan jet engine fitted with a preferred form of thrust reverser of the present invention.
Figure 5:
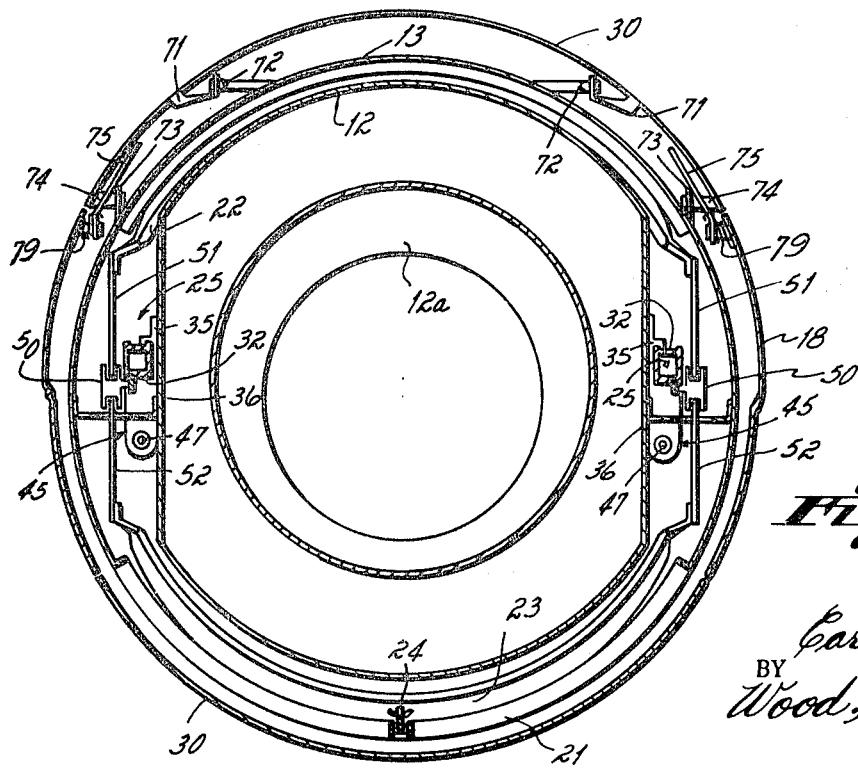
FIG. 5 is a cross-sectional view generally taken along line 5—5 of FIG. 1.

One preferred form of thrust reverser constructed in accordance with the present invention is identified generally by the numeral 10 in FIG. 1. This thrust reverser is mounted at the aft end of a fan jet engine 11. Fan jet engine 11 includes an exhaust duct 12 through which the exhaust of the main jet is discharged. It is to be understood that the wall of duct 12 surrounds the turbine exhaust pipe 12a (FIG. 5). The main exhaust duct 12 is surrounded by an annular fan duct wall 12.

As is shown in FIG. 1, the aft end 14 of the engine duct 12 and the aft end 15 of the fan duct 13 are substantially coplanar, with the jet duct extending slightly beyond the fan duct in the particular engine unit shown. The fan duct wall 13 is surrounded by a fixed cowl 16. The rear edge of the fixed cowl terminates forwardly of the end of the fan duct wall and is joined to the fan duct wall by means of a circular channel-shaped ring 17.

Thrust reverser 10 generally comprises an axially shaftable cowling 18 disposed aft of fixed cowling 16 and configured to form a continuation thereof and a pair of cascades 20 and 21 extending over two opposed portions of the movable cowling. Additionally, the thrust reverser includes a pair of arcuate blocked doors 22 and 23. The doors are mounted within the movable cowling by means of sliding pivot pins 19 and links 24. The thrust reverser further includes an actuating and support unit 25 for carrying the movable cowl and blocker doors and for reciprocating the cowl fore and aft relative to the stationary members of the jet engine. The actuating unit 25 also functions to shift the blocker doors between a stowed position and a deployed position.

More particularly, as is best shown in FIGS. 1 through 5, the present thrust reverser is positioned around the rearward portion of fan duct 13 during normal operation of the engine. However, when the thrust reverser is in its deployed or "thrust reversing" position, the movable cowling is translated aft of the discharge zone of the jet and fan ducts 12 and 13. Blocker doors 22 and 23 are shifted when the cowl is in this latter position so that they extend across the interior of the cowl, closing off the interior, and causing both the jet and fan streams to be deflected and exhausted outwardly through the cascades.

Cowling 18 is of generally frustoconical configuration and includes a circular forward ring 26 of box-like cross-section. This ring abuts channel section 17 when the thrust reverser is in its stowed position. Movable cowling 18 further includes an aft reinforcing ring 27. The forward portion of the movable cowling is provided with two openings extending over substantial, opposed arcs, e.g. arcs of 110° of the periphery of the cowling. These openings house cascades 20 and 21. Each cascade is formed of a plurality of thin curved vanes 28 which are spaced from one another and extend parallel to one another. The vanes are angulated so that they slant forwardly from their inner to their outer edges.

As is shown in FIG. 1, the outer edges of the cascades are disposed outwardly at a lesser radius than the outer surface of movable cowling 18. Thus, the cascades form a slight recessed area adapted to receive pivoted cover doors 30. These doors are pivotally mounted upon the fixed cowling and are pivoted inwardly over the cascades when the thrust reverser is in its stowed position. It is to be understood that the angulation of the cascades and their disposition about the periphery of the movable cowling can be modified so that the exhaust jet streams are directed away from any portion of the airplane.

Movable cowling 18 carries blocker doors 22 and 23. The doors are secured to pivot pins 19 which slide along tracks (not shown) disposed at the periphery of the cowling rearwardly of the cascades 20 and 21. The doors are of arcuate configuration and when they are in their stowed position lie adjacent to the inner surface of the cowling and the rearward portions of the cascades. The mid portion of the front face of each of the doors 22 and 23 is connected to a link 24. The opposite end of each of these links is pivotally mounted to the forward end of movable cowl 18 as by means of pivot pins 31 located forwardly of the cascades 20 and 21.

When the blocker doors are in their deployed position as shown in FIG. 11, they abut one another and substantially close off the interior of the movable cowling 18 rearwardly of cascades 20 and 21. The doors are shifted between their stowed and deployed positions by means of actuating unit 25 which also functions to support and to shift the movable cowl 18.

Actuating unit 25 includes box-like rail members 32. The rear end of each of the rail members 32 is secured to and supports movable cowling 18 (FIGS. 2 and 3). The rails are configured, as is best shown in FIG. 7, to include upper and lower flanges 33 and 34. These flanges extend from the inner wall of the rail and track in grooves formed in support brackets 35.

Each of the support brackets 35 is mounted upon a flat section 36 of inner duct wall 12 (FIGS. 5 and 7). Each of the support brackets 35 also includes outwardly extending center arm 37 having a longitudinally extending flange 38 in engagement with corresponding grooves in the box-like rail member. The support brackets thus slidably carry rails 32 and the rails in turn carry the cowling. The lower wall of each rail member 32 is also provided with a T-shaped slot 40 which slidably carries a T-shaped rack member 41, the bottom edge of the rack member being provided with teeth 42 adapted for engagement with a drive pinion 43.

Figure 4:
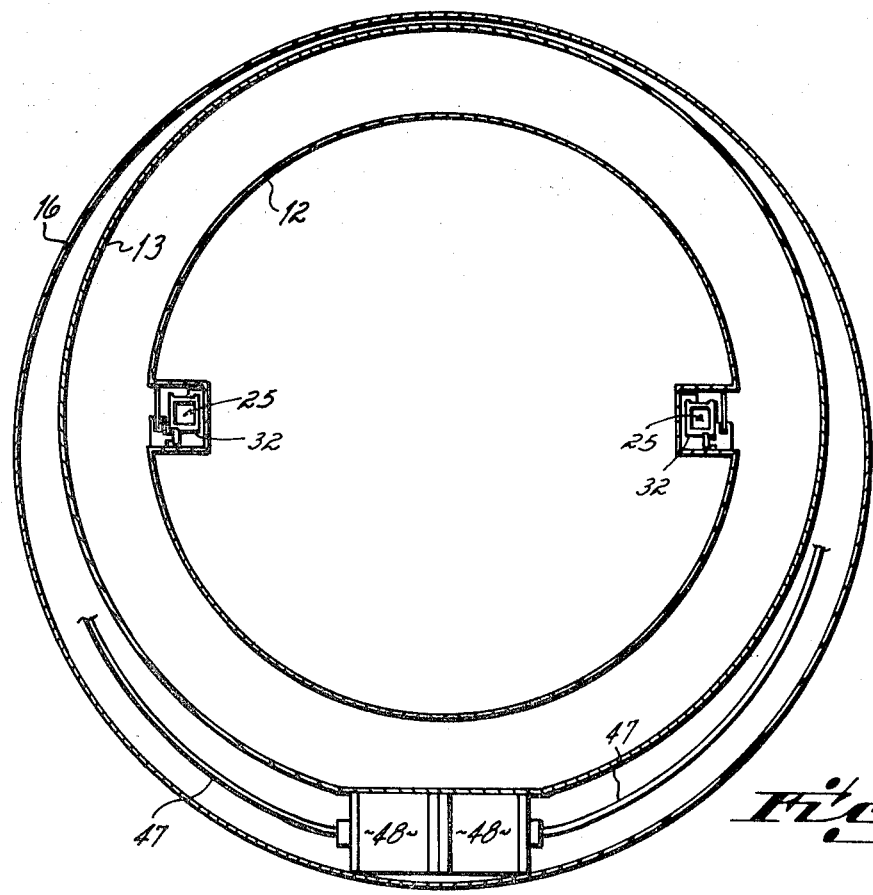
FIG. 4 is a cross-sectional view taken along line 4—4 of FIG. 1.

Drive pinion 43 is mounted upon a shaft 44 carried by bracket 35. This pinion forms part of gear reduction unit 45 which is driven by a worm gear 46 rotated by flexible shaft 47. This shaft is in turn interconnected to a suitable motor, such as a fluid motor 48, mounted within the stationary cowling 16 (FIGS. 1 and 4).

Rack 41 carries a bifurcated bracket 50, which bracket in turn is pivotally secured to the ends of actuating links 51 and 52. The opposite end of each of these links is pivotally secured to the intermediate portion of the rear face of one of the blocker doors 22 or 23. Rack 41 is adapted to be placed in driving connection with rail 32 or, alternatively, to be shifted relative thereto. The interconnection between these members is controlled by a latch mechanism 53 best shown in FIGS. 10, 11 and 12.

More particularly, latch mechanism 53 includes a pivoted latch member 54 which is carried by rail 32.

The latch member is generally T-shaped and includes an upwardly extending projection 55 and a downwardly extending projection 56. The forward edge of the latch member interconnecting these projections is preferably of a slightly convex configuration, while the rearward edges 57 and 58 of the projections 55 and 56 are preferably angulated to form cam surfaces.

Latch member 54 is adapted to be locked in its rail driving position by means of a sliding angle member 61. This angle member is slidably supported inside of rail 32 adjacent to the upper wall thereof as by means of support arm 62. Angle member 61 is spring urged toward the latch, i.e. to the right in FIG. 12, by means of a tension spring 60. one end of which is connected to rail member 32 and the other end of which is connected to an angle member 61.

FIGS. 8-10 show the latch member in its rail driving position, i.e. the position in which rail 32 and rack 41 are rigidly interconnected, with the rack driving the rail. With the latch in this position, the lower projection 56 extends downwardly through an opening 63 in the bottom wall of the rail into a notch 64 in the rack. The latch is held in this position by the engagement of angle member 61 with a horizontal shoulder 65 formed on the upper edge of the latch member. When the latch is in this position, its upwardly extending projection 55 is disposed within an opening 66 in the upper wall of the rail member 32. The top edge of this projection is disposed below horizontal arm 67 of support bracket 35. Pinion 43 is thus effective to drive back 41 and the rack is in turn effective to drive rail 32. Rail 32 is in turn rigidly connected to movable cowl 18 and causes the cowl to be shifted in accordance with shifting movements of the rack.

Latch member 54 is shiftable at the rearward limit of movement of cowl 18 to a second position in which the rack is disengaged from the rail and is free to move rearwardly relative to the rail. This second position of the latch is illustrated in FIGS. 11 and 12, with FIG. 10 illustrating the condition of the latch immediately prior to its shifted position.

More particularly, as the rack 41 and rail 32 are shifted rearwardly, the upstanding leg of angle member 61 eventually engages the bracket 35. Thus, further rearward movement of angle 61 is arrested. However, the rail and rack continue to move aft (to the right in FIGS. 11 and 12). As this movement continues, angle member 61 becomes disengaged from shoulder 65 of the latch, freeing the latch for counterclockwise (upward) movement. Upper projection 55 of the latch is then brought into a position in which it moves upwardly through aligned openings 66 and 68 in the rail member and in the arm of bracket 35, respectively. The latch member is cammed upwardly into this position by the engagement of the rack notch with rear cam surface 58 on the lower projection. As the latch member shifts upwardly, the lower end of the latch member becomes disengaged from the notch in the rack and rides on the upper surface 70 of the rack member. The rack member is thus free to continue its rearward movement while rail 32 is rigidly locked against further aft movement by the engagement of the upper projection 55 of the latch member with the opening in the support bracket 35.

During the period in which the rack and rail are moved in unison, blocker doors 22 and 23 are retained in their stowed position adjacent to the inner wall of the movable cowl member and inner surface of the cascades (FIG. 10). However, after the rearward motion of rails 32 and cowl 18 is arrested and rack 32 continues to move rearwardly, links 51 and 52 are carried rearwardly through their interconnection to bifurcated bracket 50. These links cause the blocker doors to be pivoted to their deployed position shown in FIG. 11. More particularly, the forward edges 69 of the blocker doors are shifted toward the center line of the cowl, while the pivot pins 19 of the blocker doors are shifted forwardly, the movable ends of links 24 being shifted toward rail members 32.

A typical operating cycle of the thrust reverser commences with the thrust reverser in its normal engine-operating position shown in detail in FIG. 1 and semi-diagrammatically in FIG. 8. When the thrust reverser is in this position, movable cowling 18 is disposed forwardly with forward ring 26 disposed in abutment with channel ring 17. Cover doors 30, which are secured to the rear portion of the stationary cowling 16 by means of arms 71 secured to pins 72, are pivoted inwardly over cascades 20 and 21. It is to be understood that the doors are maintained in this position by means of pins 74 bearing against the forward face of ring 26. Thus, the outer surface of the cowling is constituted by smooth, continuous wall surfaces. Moreover, the movable cowling and blocker doors are disposed externally of continuous fan duct wall 13 so that the continuous fan duct wall surrounds the fan discharge and no portion of this duct wall includes or is otherwise effected by the presence of the thrust reverser.

When it is desired to deploy the thrust reverser, motor 48 is actuated and in turn drives flexible shaft 47. This shaft drives gear reduction unit 45 and through that unit causes rack 41 to be shifted rearwardly. It is to be understood that the latch at this time is in the rail-driving position so that rails 32 are shifted rearwardly along with rack 41.

As the rails move rearwardly, they carry movable cowl 18 from the position shown in FIG. 8 to the position shown in FIG. 9. The forward surface of this movable cowl carries the arcuate arms 73 which cradle pins 74 mounted on the forward edge of cover doors 30. The engagement of arm 73 and the forward face of ring 26 with pin 74 is effective to hold the cover doors in their closed position. However, as the movable cowl 18 is shifted rearwardly (FIG. 9), arms 73 cam pins 74 outwardly, causing the doors 30 to swing outwardly toward their open position shown in dotted lines in FIG. 1 and in solid lines in FIGS. 9, 10 and 11.

As the doors 30 are cammed outwardly, locking arms 75 mounted on the interior of stationary cowling 16 and spring urged rearwardly as by means of tension spring 79 (FIG. 5), begin pivotal movements following the cowling. The ends of these arms 75 are provided with hook-like recesses 76 which ride over pins 74 on the blocker doors and thereby function to hold the blocker doors in their open position.

The movable cowling 18 continues to shift rearwardly with the doors 22 in their stowed position as indicated in FIG. 10. When the rack and rails reach the position there shown, latch 54 is shifted to its rack-disengaging and rail-locking position shown in FIG. 12. With the latch thus shifted, rearward movement of movable cowl 18 is stopped with the cowl displaced as shown in FIG. 1 with its forward edge, i.e. ring 26, substantially surrounding the exhaust ends of the main engine exhaust duct 12 and fan duct wall 13. At this point the doors 22 and 23 are still stowed and exhaust from both of these ducts still passes freely through the movable cowling. However, as rack 41 continues to move relative to the now stationary rails 32, the blocked doors 22 and 23 are shifted to their deployed position shown in solid lines in FIG. 11 and in dotted lines in FIG. 1.

With the doors in this position, the interior of the movable cowl 18 is closed. The exhaust gases both from main engine duct 12 and fan duct 13 thus strike the angulated faces of the blocker doors and are projected outwardly and forwardly in a reverse direction through cascades 20 and 21. In this manner a reverse, or braking, thrust is applied to the aircraft.

When it is desired to return the thrust reverser to its normal engine operating position, motor 48 is again operated but in a reverse direction. As a result, rack 41 is driven forwardly, although rail 32 is still initially retained in its locked, rearward position. As the rack moves forwardly, blocker doors 22 and 23 are pivoted outwardly and are returned from their blocking position shown in FIG. 11 to their stowed position shown in FIG. 10. Continued movement of the rack forwardly brings the notch 64 of the rack into registry with opening 63 in the rail member. The latch member then falls freely downward into the notch and locks the rack and rail together. Spring 60 shifts angle member 61 over surface 65 of latch member 54 to lock the latch member in the down position. The latch member 54 thus is effective to reconnect the rack 41 and rail 42, while the upper projection of the latch member is disengaged from stationary support bracket 35. Thus, the rack and rail now move forwardly in unison with the movable cowl member.

As the movable cowl member approaches its forward position (FIG. 9), arms 73 on the movable cowl engage pivot arms 75 on the stationary cowl. Latch arms 75 are thus caused to rotate forwardly and to disengage themselves from pins 73. The cover doors are thus spring urged inwardly and returned to their closed position in FIG. 8. Further forward movement of the rack and rails results in a return of the thrust reverser to its nomal engine-operating position shown in solid lines in FIGS. 1 and 8.

From the above disclosure of the general principles of the present invention and the detailed description of one preferred embodiment, those skilled in the art will readily comprehend various modifications to which the present invention is susceptible. Therefore, I desire to be limited only by the scope of the following claims.

Having described my invention, I claim:

1. A thrust reverser for a fan jet engine of the type having a main exhaust duct surrounded by a continuous annular fan exhaust duct, the two ducts terminating in substantially the same vertical plane, said jet engine further including a fixed cowl surrounding the fan duct and terminating in a plane spaced forwardly of the aft end of said duct, said thrust reverser comprising:
   a movable cowl shiftable between a stowed position, in which said movable cowl surrounds said fan duct and forms a continuation of said fixed cowl, and a deployed position in which said movable cowl is disposed aft of the discharge end of said fan and main ducts,
   means for shifting said movable cowl between said stowed and deployed positions,
   said movable cowl carrying a set of cascades disposed over a portion of the periphery of said cowl, said cascade comprising parallel plates angulated forwardly and outwardly,
   a pair of arcuate blocker doors carried by said movable cowl,
   means normally positioning said blocked doors in a stowed position closely adjacent to the inner wall of said movable cowl,
   means for shifting said blocker doors to a deployed position in which said blocker doors substantially block the interior of said movable cowl when said cowl is in its deployed position, said blocker doors being effective to cause the gases discharged from said main duct and said fan duct to be exhausted outwardly through said cascade and reversed in direction.

2. The thrust reverser of claim 1 in which said means for shifting said cowl also provide the sole support for said movable cowl.

3. The thrust reverser of claim 1 in which said cascades are recessed slightly from the periphery of said cowl and in which pivoted doors are carried by said engine to cover said cascades when said movable cowl is in a stowed position.

4. The thrust reverser of claim 1 in which said means for shifting said movable cowl includes a reciprocating rail secured at its aft end of said cowl,
   a stationary support bracket carried by said engine for slidably carrying said rail,
   and means for reciprocating said rail.

5. The thrust reverser of claim 4 in which the means for shifting said rail comprise:
   a rack,
   a motor for driving said rack,
   means selectively interconnecting said rack and said rail,
   and link means interconnecting said rack and said blocker doors.

6. The thrust reverser of claim 5 in which said rail is of box-like cross-section and includes upper and lower flanges disposed along its inner wall in slidable engagement with said support bracket and in which said rack is of T-shaped configuration and is adapted, when not interconnected to said rail, to slide relative thereto.

7. The thrust reverser of claim 5 in which said means for selectively interconnecting said rack and rail comprise a pivoted latch carried by said rail and having a projection adapted in one position to pass through an opening in said rail into engagement with said rack.

8. The thrust reverser of claim 7 in which said latch includes a second projection adapted when the latch is in a second position to pass through an opening in said rail and abut said stationary support member to prevent further movement of said rail, said first projection being disengaged in said second position from said rack.

9. The thrust reverser of claim 5 further comprising:
   links interconnected at one end to said rack and at the other end to one of said blocker doors,
   means arresting movement of said rail when said cowl is in its deployed position,
   means actuating said latch to disconnect said rail and said rack, whereby said rack is shifted a further distance aft relative to said rail,
   said links causing inwardly pivotal movement of said blocker doors.

10. The thrust reverser of claim 9 in which said blocker doors are secured to pivot pins slidably mounted along the interior of said movable cowl and in which said links are pivotally connected to said blocker doors and to the forward portion of said movable cowl.

11. The thrust reverser of claim 3 further comprising means carried by said movable cowl and engageable with members carried by said movable door to shift said movable door to an open position when said cowl is shifted from said stowed position to its deployed position.

12. The thrust reverser of claim 11 in which the members carried by said movable door are pins and the means carried by said movable cowl are arcuate arms, said doors being spring urged inwardly toward said cowl.

13. The thrust reverser of claim 12 further comprising means for releasably retaining said doors in their open position, said means comprising hook members pivotally mounted upon said engine, said hook members being spring urged toward engagement with said pins.

14. The thrust reverser of claim 13 further comprising means for returning the doors to their closed position when said cowl is returned to its stowed position, said means comprising portions of said arms positioned to engage said hooks for disengaging them from said pins.

15. A thrust reverser for a jet engine of the type having an exhaust duct, said jet engine further including a fixed cowl surrounding the exhaust duct and terminating in a plane spaced forwardly of the aft end of said duct, said thrust reverser comprising:
   a movable cowl shiftable between a stowed position, in which said movable cowl surrounds said exhaust duct and forms a continuation of said fixed cowl, and a deployed position in which said movable cowl is disposed aft of the discharge end of said duct,
   means for shifting said movable cowl between said stowed and deployed positions, said movable cowl carrying a set of cascades disposed over a portion of the periphery of said cowl, said cascade comprising parallel plates angulated forwardly and outwardly, a pair of arcuate blocker doors carried by said movable cowl, means normally positioning said blocker doors in a stowed position closely adjacent to the inner wall of said movable cowl, means for shifting said blocker doors to a deployed position in which said blocker doors substantially block the interior of said movable cowl when said cowl is in its deployed position, said blocker doors being effective to cause the gases discharged from said exhaust duct to be reversed in direction and exhausted outwardly through said cascade, said means for shifting said movable cowl including a reciprocating rail secured at its aft end of said cowl, a stationary support bracket carried by said engine for slidably carrying said rail, and means for reciprocating said rail.

16. The thrust reverser of claim 15 in which the means for shifting said rail comprise:
a rack,
a motor for driving said rack,
means selectively interconnecting said rack and said rail,
and link means interconnecting said rack and said blocker doors.

17. The thrust reverser of claim 15 in which said rail is of box-like cross-section and includes upper and lower flanges disposed along its inner wall in slidable engagement with said support bracket and in which said rack is of T-shaped configuration and is adapted, when not interconnected to said rail, to slide relative thereto.

18. The thrust reverser of claim 15 in which said means for selectively interconnecting said rack and rail comprise a pivoted latch carried by said rail and having a projection adapted in one position to pass through an opening in said rail into engagement with said rack.

19. The thrust reverser of claim 15 in which said latch includes a second projection adapted when the latch is in a second position to pass through an opening in said rail and abut said stationary support member to prevent further movement of said rail, said first projection being disengaged in said second position from said rack.

20. The thrust reverser of claim 15 further comprising:
links interconnected at one end to said rack and at the other end to one of said blocker doors,
means arresting movement of said rail when said cowl is in its deployed position,
means actuating said latch to disconnect said rail and said rack, whereby said rack is shifted a further distance aft relative to said rail,
said links causing inwardly pivotal movement of said blocker doors.

21. The thrust reverser of claim 20 in which said blocker doors are secured to pivot pins slidably mounted along the interior of said movable cowl and in which said links are pivotally connected to said blocker doors and to the forward portion of said movable cowl.

References Cited

UNITED STATES PATENTS

| | | | |
|---|---|---|---|
| 3,024,605 | 3/1962 | Nash | 239—265.19 |
| 3,262,269 | 7/1966 | Kutney | 60—226 A |
| 3,492,821 | 2/1970 | Monaghan | 60—229 |

CLARENCE R. GORDON, Primary Examiner

U.S. Cl. X.R.

60—230, 232; 239—265.31, 265.33